(12) United States Patent
Taylor et al.

(10) Patent No.: US 7,921,872 B2
(45) Date of Patent: Apr. 12, 2011

(54) GAS VALVE

(76) Inventors: Shane S. Taylor, Englewood, CO (US); Peter T. McCarthy, Valencia, CA (US)

( * ) Notice: Subject to any disclaimer, the term of this patent is extended or adjusted under 35 U.S.C. 154(b) by 1100 days.

(21) Appl. No.: 10/614,395

(22) Filed: Jul. 3, 2003

(65) Prior Publication Data

US 2004/0079419 A1 Apr. 29, 2004

Related U.S. Application Data

(60) Provisional application No. 60/394,194, filed on Jul. 5, 2002.

(51) Int. Cl.
*F16K 27/08* (2006.01)
(52) U.S. Cl. .............. 137/382; 128/202.27; 128/205.22; 128/205.24
(58) Field of Classification Search ............. 137/232, 137/377, 382, 382.5; 128/202.27, 205.22, 128/205.24
See application file for complete search history.

(56) References Cited

U.S. PATENT DOCUMENTS

| | | | |
|---|---|---|---|
| 391,431 A | 10/1888 | Shoff | |
| 868,022 A | 10/1907 | Shafer | |
| 898,386 A * | 9/1908 | Nagle | 137/382 |
| 2,053,931 A | 9/1936 | Work | |
| 2,725,072 A * | 11/1955 | Hershman | 137/377 |
| 2,755,816 A | 7/1956 | Collins | |
| 3,045,688 A | 7/1962 | Fay | |
| 3,113,693 A | 12/1963 | Stull | |
| 3,426,790 A * | 2/1969 | Dey | 137/505.18 |
| 4,015,630 A * | 4/1977 | Contreras | 137/505.25 |
| 4,219,017 A * | 8/1980 | Shamlian et al. | 128/204.26 |
| 4,226,257 A | 10/1980 | Trinkwalder | |
| 5,183,075 A | 2/1993 | Stein | |
| 5,509,407 A * | 4/1996 | Schuler | 128/205.24 |
| 5,526,843 A | 6/1996 | Wolf et al. | |

(Continued)

FOREIGN PATENT DOCUMENTS

DE 33 38 111 A 5/1985

(Continued)

OTHER PUBLICATIONS

U.S. Appl. No. 10/265,533, filed Oct. 3, 2002, Taylor.

(Continued)

*Primary Examiner* — John Rivell
*Assistant Examiner* — Craig M Schneider
(74) *Attorney, Agent, or Firm* — Kauth, Pomeroy, Peck & Bailey LLP

(57) ABSTRACT

A gas valve has housing and a barrier. The housing has a passageway with an upstream port and a downstream port. The barrier is disposed across the passageway and is formed from a material which is porous to compressed gas but which substantially prevents a low-pressure liquid from advancing through the passageway downstream of the barrier. The passageway may also contain a gas conditioner and/or a filter that is preferably disposed downstream of the barrier.

In another embodiment, a valve comprises an inlet opening, a passageway extending downstream of the inlet opening, an attachment portion near the inlet opening, and a movable cap adapted to cover the inlet opening. The cap has a range of motion between a first position, wherein the cap covers the inlet opening, and a second position outside of the passageway, wherein the cap is displaced from the inlet opening. The cap is biased towards the first position. The gas valve may further comprise a gas regulator in fluid communication with the passageway.

8 Claims, 13 Drawing Sheets

U.S. PATENT DOCUMENTS

| | | | |
|---|---|---|---|
| 5,685,297 A * | 11/1997 | Schuler | 128/205.24 |
| 5,687,712 A | 11/1997 | Semeia | |
| 5,911,220 A | 6/1999 | Morgan et al. | |
| 6,206,032 B1 | 3/2001 | Hill | |
| 6,383,386 B1 | 5/2002 | Penth et al. | |
| 6,601,609 B2 | 8/2003 | Taylor | |
| 2002/0179153 A1 | 12/2002 | Taylor | |
| 2003/0106593 A1 | 6/2003 | Taylor | |

FOREIGN PATENT DOCUMENTS

| | | |
|---|---|---|
| DE | 40 06 465 A | 9/1991 |
| EP | 0 663 220 A | 7/1995 |
| EP | 0 807 571 A1 | 6/1997 |
| FR | 2 420 280 A | 10/1979 |
| GB | 1 317 659 | 7/1970 |
| WO | WO 96/35611 | 11/1996 |
| WO | WO 98/22186 | 5/1998 |

OTHER PUBLICATIONS

U.S. Appl. No. 10/112,106, filed Feb. 28, 2002, Taylor.

* cited by examiner

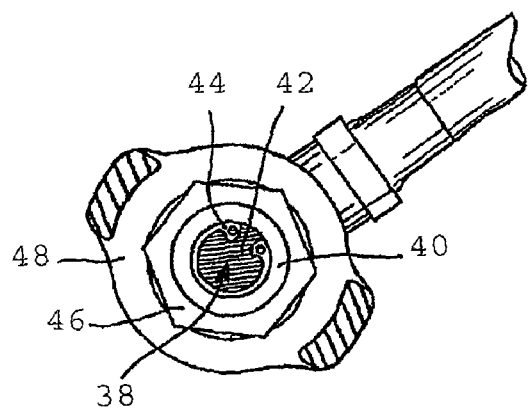
FIG.2
(PRIOR ART)
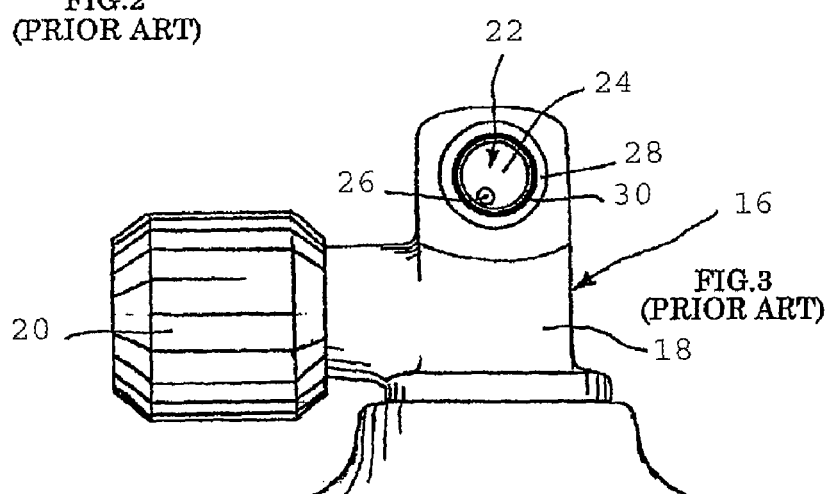
FIG.3
(PRIOR ART)

GAS VALVE

RELATED APPLICATIONS

The present application is based on and claims priority under 35 U.S.C. §119 to U.S. Provisional Patent Application No. 60/394,194 filed Jul. 5, 2002.

BACKGROUND OF THE INVENTION

1. Field of the Invention

The present invention is directed to a gas valve, and more specifically, to a gas valve for use in a gas regulator that allows entry of a compressed gas, but blocks the entry of contaminants into the gas regulator.

2. Description of the Related Art

Scuba tanks generally utilize a pressurized source of breathable gas, such as compressed air as well as mixed gas blends, having pressures in the range of 3,000 to 5000 psi. A two stage pressure reduction system is typically used to deliver the gas to a scuba diver at a pressure that is within an appropriate pressure range for underwater diving. A first stage regulator reduces the pressure of gas from the scuba tank to an intermediate pressure range of about 120 to 140 psi, while a second stage regulator, typically incorporated into a breathing mask, regulates the flow of gas delivered to the diver to a pressure that depends on the depth of the diver in the water.

First stage regulators are generally connected to the scuba tank using one of two types valve connection arrangements: yoke-type connection or DIN valve connection. In yoke-type connection systems, the regulator comprises a round opening that is filled by a metal filter surrounded by a raised collar with an o-ring. The scuba tank has an inlet/outlet tank valve with a small aperture located near the middle of a round recessed area. The raised collar of the regulator valve fits snugly within the recessed area of the tank valve. A hand knob is used to secure the tank valve and to form a seal at the o-ring. With a DIN valve connection, the first stage regulator screws directly into the scuba tank valve outlet opening using either five or seven threads, depending upon the pressure to be contained within the tank. Other, less common, connection arrangements are also available, such as those utilized in technical diving and rebreather units.

The dual stage regulator system is attached to a tank valve using a hand knob with a screw member that is part of the regulator assembly. Once the first stage regulator is attached to the scuba tank, an closed system is formed between the input of the first stage regulator and the input of the second stage regulator that is unexposed to the ambient environment. However, the interior components of the first stage regulator can potentially become exposed to external contaminants such as salt water, fresh water, wash water, airborne particulates, and the like when the scuba tank is not connected to the scuba tank. Such contamination can rust and corrode critical regulator components such as metal air filters and lead to the clogging of small apertures or orifices. This can lead to potentially catastrophic consequences during use of the regulator system due to partial or complete failure of the equipment.

A dust cover is usually attached to the first stage regulator for covering the entrance port of the first stage regulator when the regulator is not attached to the scuba tank, thus preventing the entrance of contaminants into the regulator system. The cover is typically held in place using the same hand knob that is used for attaching the scuba tank. Between or after dives it is, however, easy for the diver to either forget to attach the cover or simply decide this precaution is unnecessary.

In order to avoid this dependence on the diver to protect the internal components of the regulator system by manually attaching the dust cover, it would be beneficial to have a regulator control valve that automatically seals the entrance port of the regulator from contaminants such as water when the scuba tank is disconnected and/or when pressure near the entrance port of the first stage regulator is below a predetermined minimum.

One solution for automatically covering the entrance port of a first stage regulator when the scuba tank is not connected is disclosed in U. S. patent application Ser. No. 09/872,130, which is herein incorporated by reference in its entirety. In this device, a piston is disposed inside the regulator valve near the entrance port. The piston is biased to a closed position that covers the regulator valve entrance port, thereby preventing the entrance of water and/or other possible contaminants when a scuba tanks is not connected. When the scuba tank is connected to the regulator valve and the tank valve is opened, gas pressure overcomes the bias force on the piston, thus opening the regulator valve opens to allow the passage of gas.

SUMMARY OF THE INVENTION

One aspect of the present invention involves a gas valve comprising a housing and a barrier. The housing has a passageway with an upstream port and a downstream port. The barrier is disposed across the passageway and is formed from a material which is porous to compressed gas but which substantially prevents a low-pressure liquid from advancing through the passageway downstream of the barrier. The passageway may further comprise a gas conditioner and/or a filter that is preferably disposed downstream of the barrier, but which may also be disposed upstream of the barrier.

The barrier may be substantially immobile in an upstream-downstream direction when exposed to compressed gas and comprise various forms and materials. For instance, the barrier may comprise a dome portion that protrudes beyond the surface of an entrance port of the valve. The barrier may also comprise a waterproof membrane, a nonmetallic foam material, or a rigid foam material. For example, the barrier may comprise an expanded polytetrafluoroethylene such as GORE-TEX™. In certain embodiments, the barrier plastically deforms when exposed to compressed air, while in other embodiments, the barrier will not plastically deform when exposed to compressed air. In yet other embodiments, the barrier is a membrane, which may comprise one or more slits and/or pinholes. The membrane may comprise a cross in the form of two orthogonal slits.

In another aspect of the present invention, the gas valve further comprise a gas regulator in fluid communication with the passageway. The barrier is disposed across the passageway and is formed from a material which is porous to compressed gas but which substantially prevents a low-pressure liquid from advancing through the passageway downstream of the barrier.

Another aspect of the present invention involves a gas regulator for use in regulating the flow of a compressed gas. The gas regulator comprises a valve. The valve comprises housing having a passageway with an upstream port and a downstream port, a barrier disposed across a passageway, and a filter disposed in the passageway downstream of the barrier. The gas regulator further comprises a gas pressure control member located downstream of the valve. The gas regulator may also comprise a filter disposed in the passageway downstream of the barrier. In certain embodiments, the gas regulator further comprises a cap detachably coupled to the housing for securing the barrier to the valve. The cap may comprise a threaded portion or a snap for securing the barrier to the valve.

Yet another aspect of the present invention involves a gas regulator comprising a housing having a passageway with an upstream port and a downstream port. The valve further comprises a cartridge disposed in the passageway. The cartridge comprises a barrier formed from a material which is porous to compressed gas but which substantially prevents a low-pressure liquid from advancing through the passageway downstream of the barrier. The cartridge further comprises a gas conditioner downstream of the barrier.

In certain embodiments, the gas conditioner abuts the downstream end of the barrier. The gas conditioner may comprise a filter. In other embodiments, the gas conditioner comprises a first stage and a second stage downstream of the first stage. The first stage is a filter and the second stage comprises a composition of calcium hydroxide, sodium hydroxide, and water such as DIVESORB™. The gas conditioner may comprise a gas pressure control member.

In yet another aspect of the present invention, a cartridge for use with a gas valve comprises a barrier and a gas conditioning element. The barrier is formed from a material which is porous to compressed gas but which substantially prevents a low-pressure liquid from advancing through the passageway downstream of the barrier. The gas conditioner is downstream of the barrier. The valve may further comprise gas regulator in fluid communication with the passageway.

In certain embodiments, the gas conditioner abuts the downstream end of the barrier. The gas conditioner may comprise a filter. In other embodiments, the gas conditioner comprises a first stage and a second stage downstream of the first stage. The first stage is a filter and the second stage comprises a composition of calcium hydroxide, sodium hydroxide, and water such as DIVESORB™. The gas conditioner may comprise a gas pressure control member.

Another aspect of the invention involves as valve comprising an inlet opening, a passageway extending downstream of the inlet opening, an attachment portion near the inlet opening, and a movable cap adapted to cover the inlet opening. The cap has a range of motion between a first position, wherein the cap covers the inlet opening, and a second position outside of the passageway, wherein the cap is displaced from the inlet opening. The cap is biased towards the first position. The gas valve may further comprise a gas regulator in fluid communication with the passageway.

In certain embodiments, the cap is adapted to move from the first position to the second position when the valve is attached to a source of compressed gas. In other embodiments, the cap is adapted to automatically move from the second position to the first position when the valve is disconnected from a source of compressed gas. The valve may further comprise an attachment device for coupling the cap to the valve.

Yet another aspect of the invention involves a cap for use with a gas valve having an inlet opening and an inlet sealing face surrounding the inlet opening. The cap comprises a cap body having an upstream side and a downstream side and a cap opening extending from the upstream side to the downstream side The body forms a cap sealing face on the downstream side. The cap further comprises a barrier disposed across the cap opening. The barrier is formed from a material which is porous to compressed gas but which substantially prevents passage of low-pressure liquid downstream of a downstream end of the barrier.

In certain embodiments, the cap further comprises a source sealing face disposed at the upstream side of the body. The source sealing face may be similar to the inlet sealing face. The barrier may extend across an upstream end of the cap opening.

One aspect of the invention involves a method of providing breathable air. The method comprises providing a gas valve with a barrier formed from a material which is porous to compressed gas, but which substantially prevents a low-pressure liquid from advancing through a passageway downstream of the barrier. The method additionally comprises connecting a source of compressed gas to the valve. The method further comprises flowing compressed gas through the barrier. The method also comprises conditioning the compressed gas to a condition wherein the gas may be breathed by a human.

Conditioning may comprise reducing the pressure of the air from the source to a pressure suitable for breathing. Conditioning may further comprise adapting the air for use by a scuba diver or adapting the air for use in a respiration system. The method may further comprise installing the gas valve in to a regulator.

Another aspect of the invention involves a method of providing breathable air. The method comprises providing a gas valve with a barrier formed from a material which is porous to compressed gas, but which substantially prevents a low-pressure liquid from advancing through a passageway downstream of the barrier. The method additionally comprises connecting a source of compressed gas to the valve. The method also comprises, while connecting the source of compressed gas, moving the cap to a second position wherein the cap is displaced from the inlet opening. The method also comprises flowing compressed gas through the opening. The method additionally comprises conditioning the compressed gas to a condition wherein the gas may be breathed by a human.

Conditioning may comprise reducing the pressure of the air from the source to a pressure suitable for breathing. Conditioning may further comprise adapting the air for use by a scuba diver or adapting the air for use in a respiration system. The method may further comprise installing the gas valve in to a regulator.

BRIEF DESCRIPTION OF THE DRAWINGS

The foregoing features, aspects, and advantages of the present invention will now be described with reference to the drawings of preferred embodiments that are intended to illustrate and not to limit the invention. The drawings comprise 21 figures.

FIG. 2 is a front plan view of the inlet valve arrangement of FIG. 1 taken substantially along line 2-2 of FIG. 1;

FIG. 3 is a front plan view of a gas outlet yoke-type connection valve of a scuba tank.

DETAILED DESCRIPTION OF THE PREFERRED EMBODIMENTS

Figures 1, 4:
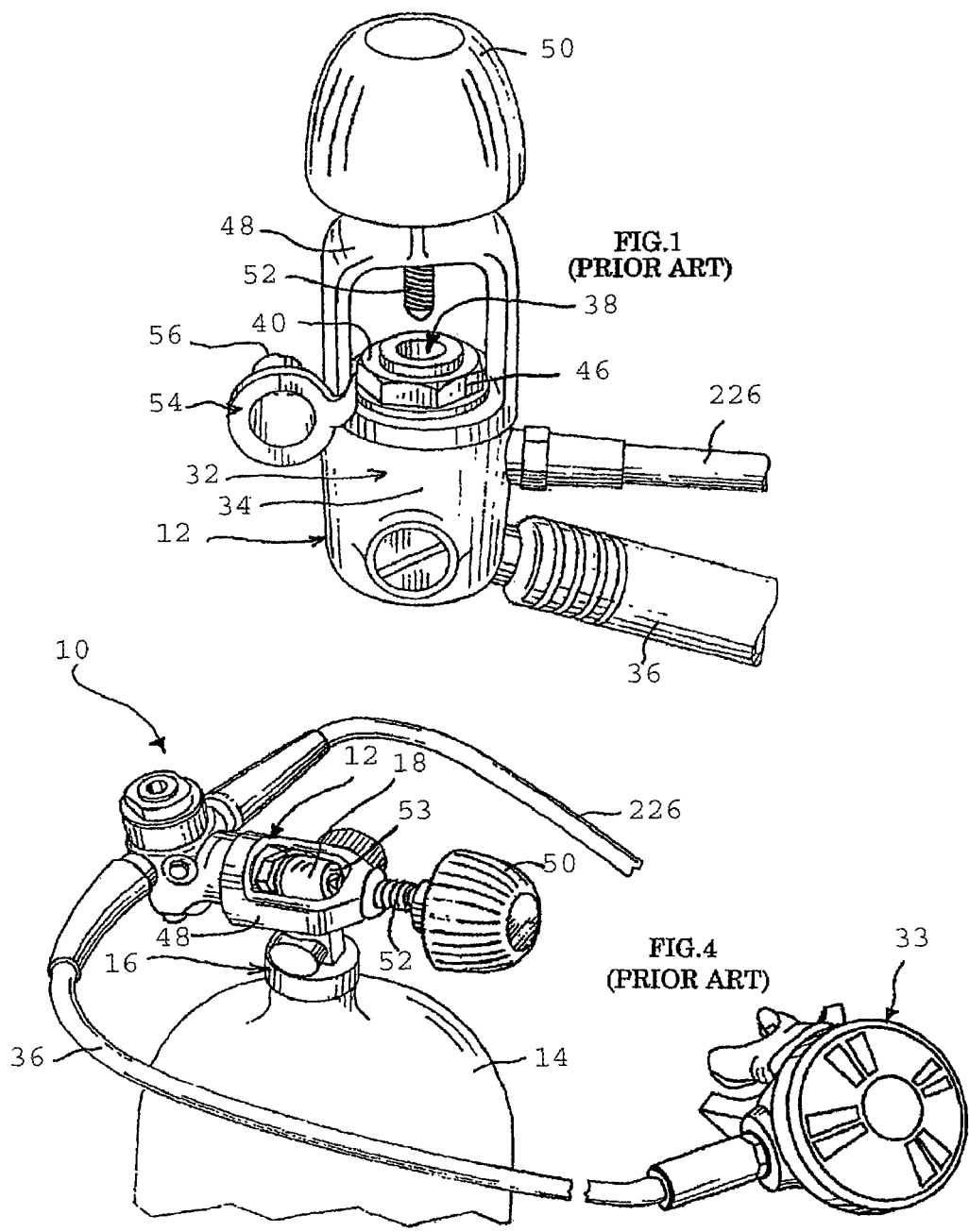
FIG. 1 is a perspective view of a first-stage regulator of a yoke-type dual stage regulator assembly for a scuba diving unit.
FIG. 4 is a top perspective view of the first stage regulator member of FIG. 1 connected to the gas outlet yoke-type connection valve of the scuba tank of FIG. 3.

These and other embodiments of the present invention will also become readily apparent to those skilled in the art from the following detailed description of preferred embodiments having reference to the attached figures; however, the invention is not limited to any particular embodiment(s) disclosed herein. Accordingly, the scope of the present invention is intended to be defined only by reference to the appended claims.

Referring to FIGS. 1-4, a scuba unit 10 of a design according to the prior art is illustrated having a regulator assembly 12 and a tank 14 for compressed breathable gas. Typically, the scuba tank 14 is a steel or aluminum cylinder designed to contain compressed gas in the range of 3,000 to 5000 psi. The most preferred breathable gas is simply compressed air. However, a variety of gas mixtures are also used, such as nitrogen/oxygen blends commonly referred to as Nitrox or other gas blends including various other inert gases. It should be understood, therefore, that when the terms breathable gas or compressed air are used in this application, such terms are intended to also include other types of gas mixtures both common and uncommon to the scuba diving industry and/or other industries in which breathable gas is supplied, such as the medical industry, firefighting, emergency rescue, etc. Another compressed gas mixture that may benefit from the present invention includes argon, which is occasionally used in conjunction with dry suit inflation rather than breathable gas mixtures.

The tank 14 of the scuba unit 10 may include a gas inlet/outlet scuba tank valve 16 comprising a scuba tank valve body 18 with a threaded portion for detachably coupling the scuba tank valve body 18 to the tank 14. The tank valve 16 additionally comprises a hand operated control knob 20 for opening and closing the tank valve 16 and an inlet/outlet opening 22. When a yoke-type valve is used, the opening 22 generally includes a recessed area 24 which contains a small orifice 26 that communicates with the interior of the tank 14 through the scuba tank valve body 18. An annular ridge 28 surrounds the recessed area 24 to form an annular groove wherein a removable o-ring 30 is disposed between the ridge 28 and the recess 24. This arrangement provides an airtight seal at the opening 22 when a regulator is connected thereto. This particular arrangement for the tank valve 16 is suitable for attachment to a yoke-type regulator. Another tank inlet/outlet arrangement (not illustrated) commonly used is designed for attachment to a DIN valve. In such embodiments, the ridge 28 is in the form of a collar which projects substantially outwardly from the scuba tank valve body 18 and includes threads that are designed for engagement with a DIN valve regulator.

The regulator assembly 12 is usually a dual or two-stage regulator including a first stage regulator member 32 and a second stage regulator member 33. The first stage regulator member 32 is detachably secured to the opening 22 of the tank valve 16 and is designed to reduce the gas pressure from the tank 14 from a pressure in the range of approximately 3,000 to 5,000 psi to an intermediate gas pressure of approximately 140 psi. The intermediate pressure gas passes through a hose 36 to the second stage regulator member 33, wherein the gas pressure is further reduced to an ambient pressure that depends upon the depth of the scuba diver. In this manner, the diver can readily breathe the gas from the second stage regulator member 33 at any depth. A second hose 226 also connects to the first stage regulator.

In a yoke-type regulator, a regulator housing 34 includes a gas inlet opening 38 which is surrounded by a raised collar or flange 40. A metal filter member 42 is positioned within the regulator housing 34 below the opening 38 for the purpose of filtering any and all gas and other materials entering the opening 38. A C-clip 44 is utilized to hold the filter 42 in the opening 38. A nut 46 maintains a yoke 48 in position in the vicinity of the opening 38. The yoke 48 is typically a U-shaped or an A-shaped element that is sized to permit the tank valve 16 to be positioned between the collar 40 and the top of the yoke 48. A hand knob 50 with a screw member 52 passes through the top of the yoke 48 in is designed to tighten against the backside 53 of the tank valve 16 to press the collar 40 against the ridge 28 and o-ring 30 of the tank valve 16 to secure the two members together. In certain regulator designs, the nut 46, the collar 40, the filter 42 and the C-clip 44 are all part of a valve housing having a threaded portion for securing the valve housing to a bore in the regulator housing 34. In other designs, these components are individually mounted within the bore as an integral part of the regulator housing 34.

When the first stage regulator member 32 is not secured to a tank valve 16, contaminants such as water can enter the inlet opening 38 and pass into the filter 42 and the rest of the regulator assembly 12. Since it is a recommended procedure to thoroughly rinse or soak all scuba diving equipment in clean fresh water after each use, entry of water into the inlet opening 38 could damage the regulator assembly 12. This is because water can rust and corrode the internal metal components of the regulator assembly 12 as well as damage other attached components such as a dive computer, and particulate contaminants can block small orifices and otherwise cause galvanic or other reactions within the regulator assembly 12, all of which will at least negatively affect the operation of the regulator and possibly cause it or its attached components to fail entirely. A dangerous situation can result if the first stage regulator member fails during use by a scuba diver while under water.

A dust cover 54 is typically employed to prevent water from entering the regulator 32 through the inlet opening 38.

The dust cover 54 is generally made of plastic or rubber and is removably positioned over or against the collar 40 when the first stage regulator member 32 is not in use. The screw 52 is tightened against the top 56 of the dust cover 54 to press the dust cover 54 firmly against the inlet opening 38, thereby preventing entry of water and other contaminants. A similar removable cap arrangement is utilized for the second stage regulator alternate air source. Unfortunately, it is a common mistake to forget to place the dust cover 54 over the inlet opening 38 before rinsing the regulator assembly 12, thereby flooding the first or second stage regulator members 32, 33. Even when the dust cover 54 is properly positioned, it may not be sufficiently tight to prevent entry of water into the inlet opening 38. Certain embodiments disclosed herein obviate the requirement for the dust cover 54 and the entire problem inherent with its use.

Various embodiments disclosed herein include a gas regulator with a gas valve comprising a barrier that incorporates different materials, structures, and/or mechanisms to selectively allow the passage of compressed gas, while precluding the passage of contaminants such as liquids, solids, or airborne particulate into the regulator. The barrier automatically blocks the entry of contaminants into the regulator system when the gas regulator is not connected to the scuba tank or another source of compressed air or other gas.

In certain embodiments, the barrier's performance is pressure sensitive and comprises a material which is porous to compressed gas, but which substantially prevents a low-pressure liquid from advancing through the passageway downstream of the barrier. In other embodiments, the barrier comprises a movable cap that is adapted to cover an inlet opening of the gas regulator, wherein the movable cap is biased towards a first position in which the movable cap covers the inlet opening. The movable cap has a range of motion between the first position and a second position wherein the movable cap is displaced from the inlet opening when a scuba tank or other source of compressed air is attached.

In certain embodiments, the barrier helps to protect the internal components of the gas regulator, such as filters and other types of gas conditioners. This automatic isolation of the internal passages of the gas regulator affords a clear advantage over prior art systems, since the components inside or connected to the gas regulator are automatically protected from exposure to contaminants. Another advantage includes a reduction or complete elimination of the time needed for cleaning the gas regulator and valve.

Figure 5:
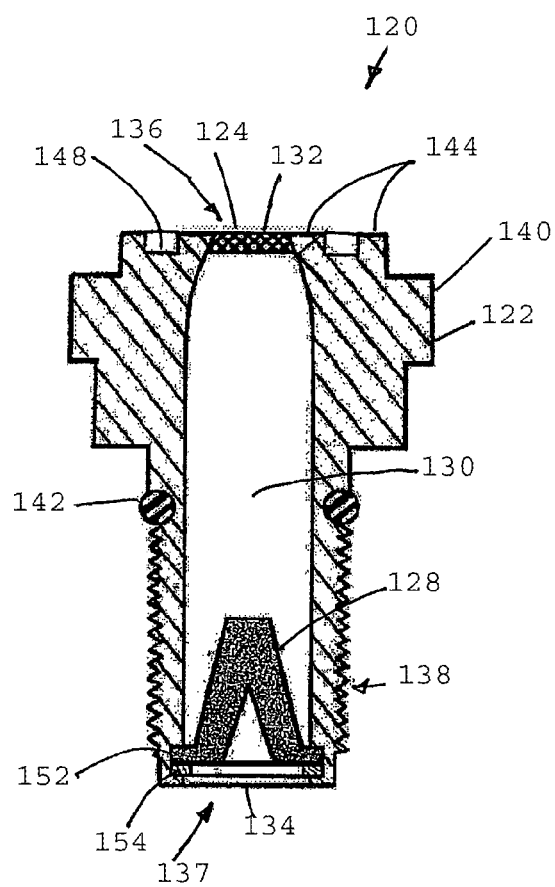
FIG. 5 is a cross-sectional view of a valve for use with a gas regulator with a barrier that is porous to compressed gas.
Figure 6:
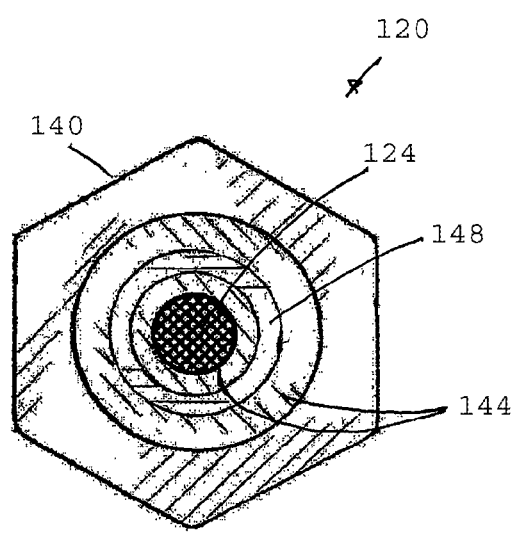
FIG. 6 is a top view of the valve shown in FIG. 5.

In an illustrative embodiment shown in FIGS. 5 and 6, a gas valve 120 comprises a valve housing 122, a barrier 124, and an (optional) gas conditioner 128. The valve housing 122 has a passageway 130 with an upstream port 132 and a downstream port 134. The barrier 124 is disposed (in the embodiment of FIGS. 5-6) near the upstream port 132 and is configured to allow a compressed gas to flow through the barrier 124 and to substantially prevent a liquid or other types of contaminants from entering the passageway 130. The gas conditioner 128 is disposed such that the compressed gas flows through the gas conditioner 128. The gas conditioner 128 may comprise a filter that is disposed in the passageway 130 downstream of the barrier 124. In certain embodiments, the gas valve 120 is coupled to or integrally formed with a gas regulator. In certain such embodiments, a member for controlling the pressure of gas flowing through the regulator is disposed downstream of the barrier 124.

The gas valve 120 is, in certain embodiments, configured for use in a first stage regulator of a dual stage regulator system. Also, some embodiments are suited for use with a scuba tank containing compressed air. Such uses of the gas valve 120 are, however, illustrative only and this does not preclude the use of the gas valve 120 with other gas sources, gas types, and regulator systems. For instance, the gas valve 120 could be used in conjunction with a regulator system that is coupled to an air compressor or a storage tank containing compressed air or another gas suitable for a particular diving environment. Embodiments of the gas valve 120 may also be used in conjunctions with yoke-type connectors, DIN valve connectors, or any other connection system arrangements used for coupling a scuba regulator to a gas supply source or rebreather unit.

The valve housing 122 has an upstream side 136 and a downstream side 137, and is preferably made of a water-resistant material such as a galvanized metal. To facilitate incorporation of the gas valve 120 into a regulator system, the valve housing 122 preferably comprises a threaded portion 138 that engages the bore of a first stage regulator housing such as, without limitation, the housing 34 discussed above. The threaded portion 138 screws into the first stage regulator housing and the valve housing 122 is tightened using a nut-shaped portion 140. The nut-shaped portion 140 may also be used to hold a yoke such as, without limitation, the yoke 48 discussed above for securing the tank valve 16 to the first stage regulator. Preferably, an o-ring 142 is used to maintain a watertight and airtight seal between the gas valve 120 and the first stage regulator housing.

The valve housing 122 may further comprise a sealing face, preferably in the form of a raised collar 144, which is configured to engage an o-ring attached to a scuba tank valve. A groove 148 is circumferentially disposed within collar 144 and may serve to provide a channel for draining water away from the upstream port 132.

The passageway 130 serves as a duct or conduit through which the gas from the scuba tank flows through the valve 120 and, where applicable, into the regulator system. The passageway 130 may also contain further components of the gas valve 120. The upstream port 132 and/or barrier 124 is preferably located at the upstream side 136 of valve housing 122 (for example, near the raised collar 144), since this location facilitates keeping water and other contaminants away from the upstream port 132 and/or barrier 124. Alternatively, the entrance port and/or barrier 124 may be located further down towards the downstream side 137 of the valve housing 122 inside the passageway 130. The passageway 130 may further comprise a groove or slot 152 located near the downstream side 137 of the valve housing 122 for securing the gas conditioner 128 (where employed) with a clip 154.

Preferably, the gas conditioner 128 is disposed near the downstream port 134 of the gas valve 120. Alternatively, the gas conditioner 128 may be disposed at a different location along the passageway 130, for instance near, just below or against the downstream end of the barrier 124. The gas conditioner 128 may comprise a filter that filters out particles and other contaminants in the air as it passes through the gas valve 120. The filter may comprise a fibrous metal filter having a conical shape as shown in FIG. 5 or, alternatively, having the form of a flat disk. Other filter shapes or types may be employed as the gas conditioner 128.

The gas conditioner 128 may also comprise a carbon material or a composition of calcium hydroxide, sodium hydroxide, and water such as DIVESORB™ (available from Dräger Group of the Federal Republic of Germany) for increasing the level of oxygen in the gas entering the gas valve 120. Such materials are used, for instance, in rebreather systems that recirculate air used by the diver. In other embodiments, the gas conditioner 128 may comprise multiple elements that are disposed sequentially along the passageway 130, each (in one embodiment) serving a different purpose.

Figure 7:
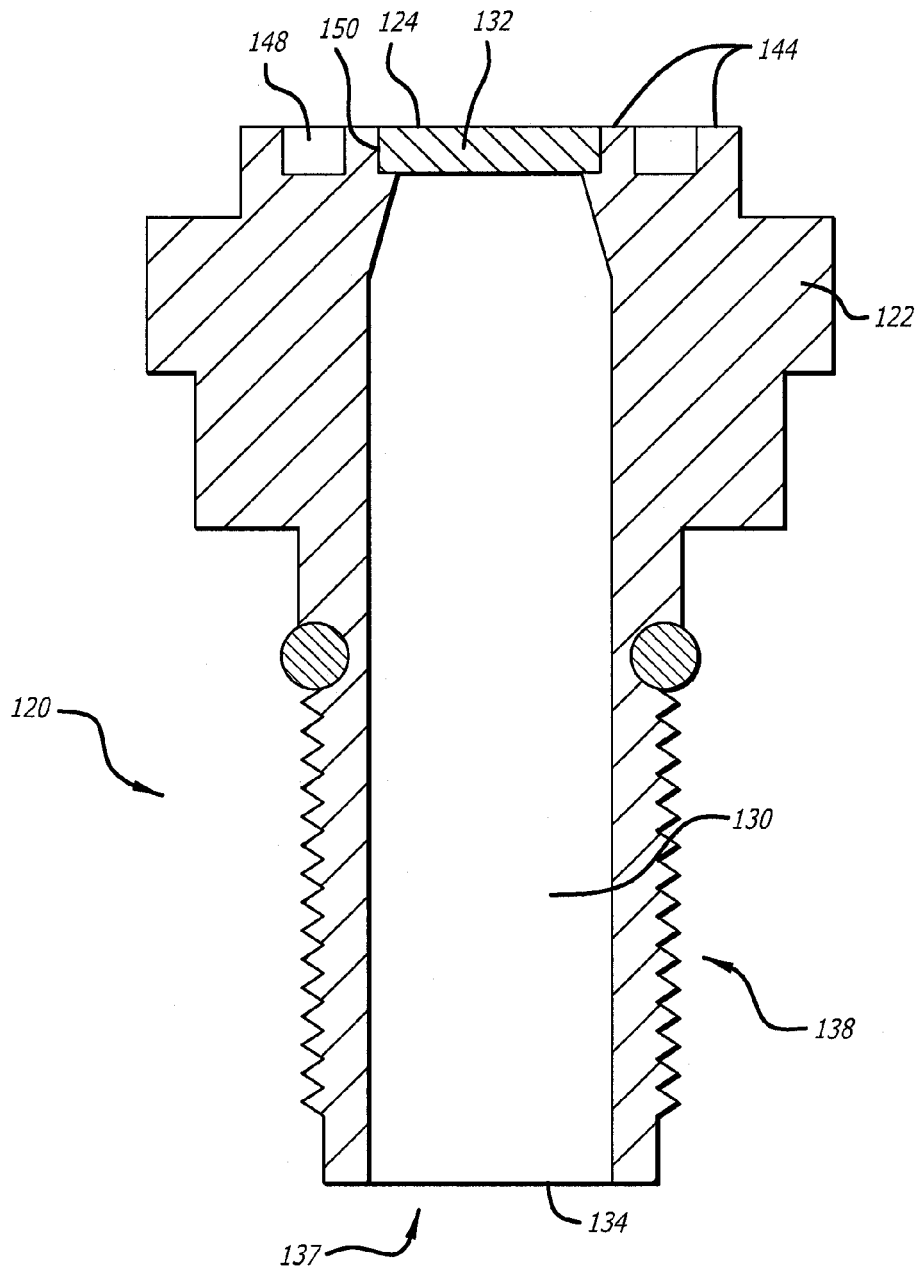
FIG. 7 is a cross-sectional view of a gas valve with a barrier that is flush with an entrance port into the valve.

Referring to FIG. 7, in certain embodiments, the gas valve 120 does not include a gas conditioner 128. Alternatively, the gas conditioner 128 may be incorporated into the barrier 124. For instance, the barrier 124 may be formed of a material that acts both to keep water and other contaminants out of the gas valve 120 when the gas valve 120 is not connected to the scuba tank and to pass and filter compressed air flowing through the barrier 124 when the gas valve is connected to the scuba tank. In such embodiments, a single element performs the functions of both of the gas conditioner 128 and the barrier 124. Such a barrier may comprise, for example, a multi-layered structure with barrier and filter layers bonded together and arranged sequentially in an upstream-downstream direction.

As shown in FIG. 5, the wall of the passageway 130 may be tapered below the upstream port 132 such that the diameter of the passageway 130 increases when moving downstream of the upstream port 132. Alternatively, as illustrated in FIG. 7, the passageway 130 may comprise a lip 150 located near the upstream port 132 and configured for supporting the downstream end of the barrier 124. The lip 150 facilitates installation and removal of the barrier 124 from the upstream side of the valve housing 122. As yet another alternative, the passageway 130 may have substantially parallel inner walls (e.g., a substantially cylindrical passageway or one having a substantially constant square or rectangular cross-section.)

Referring again to FIGS. 5 and 6, the barrier 124 is preferably located at or near the upstream port 132 of the valve housing 122 and is also preferably at least partially contained inside the passageway 130. The barrier 124 may comprise any of the various types of material that are either waterproof or water resistant. The barrier 124 may comprise a rigid foam material or a rigid nonmetallic foam material. For example, the barrier 124 may comprise a material porous to compressed gas such as an expanded polytetrafluoroethylene (e.g., GORE-TEX™, which is available from Gore & Associates, Inc., of Newark, Del.; Latex, Neoprene, or polyurethane). In certain embodiments, the barrier 124 plastically deforms when exposed to compressed air, while in other embodiments, the barrier 124 will not plastically deform when exposed to compressed air. When a scuba tank is not connected to the gas valve 120 or when a scuba tank is connected, but with the tank valve closed, the barrier 124 prevents low-pressure liquids and other contaminants (e.g., those that are at or near atmospheric pressure) from entering the passageway 130 downstream of the barrier 124.

The upstream end of the barrier 124 may be substantially flush with (or alternatively, upstream of) the sealing face or the upstream surface of the raised collar 144, as illustrated in FIGS. 5 and 7. In such embodiments, water that is splashed onto the outside surface of the barrier 124 will have a tendency to run off and be retained in the groove 148 of the raised collar 146. Any water remaining on the outside surface of the barrier 124 does not enter the passageway 130 because of the material properties and/or construction of the barrier 124.

Figure 8:
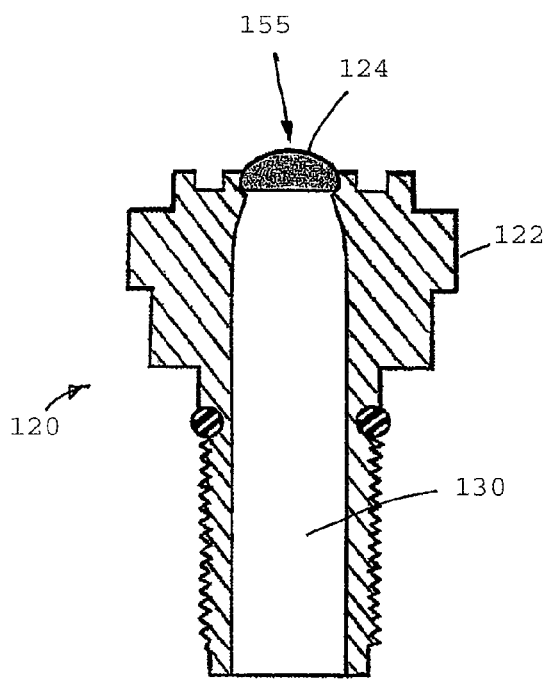
FIG. 8 is a cross-sectional view of a gas valve with a dome shaped barrier at an entrance port into the valve.
Figure 9:
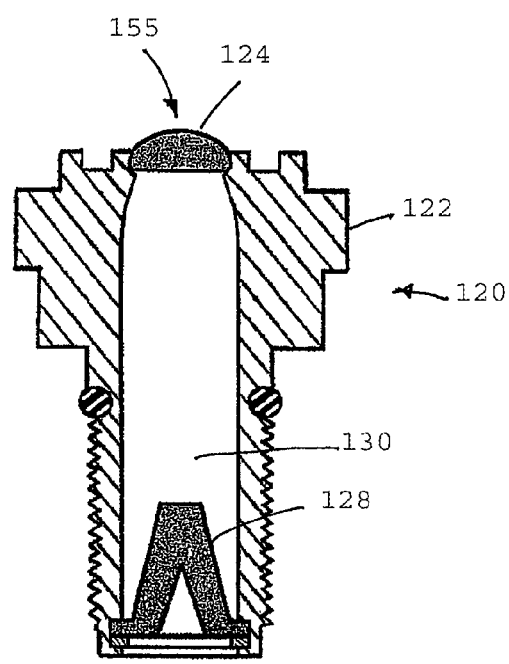
FIG. 9 is a cross-sectional view of a gas valve having a dome shaped barrier at an entrance port into the valve and a conical shaped gas conditioner downstream of the barrier.

In certain embodiments, the barrier 124 comprises a dome portion 155, as illustrated in FIGS. 8 and 9. FIG. 8 illustrates a gas valve 120 that either contains no gas conditioner 128 in the passageway 130 or incorporates the functions of the gas conditioner 128 into the barrier 124. FIG. 9 illustrates a gas valve 120 wherein the gas conditioner 128 is located near the downstream side 137 of the valve housing 122. The dome portion 155 of the barrier 124 in the illustrated embodiment may offer certain advantages such as the ability to more readily direct water and other contaminants off of and away from the outside surface of the barrier 124.

The dome portion 155 may comprise a resilient material (for example, a suitable material selected from those disclosed above for forming the barrier 124 that compresses when a scuba tank valve is attached and returns to its original dome shape when the scuba tank is again disconnected. Alternatively, a spring or other similar device may be used maintain the dome shape of the barrier 124.

Figure 10:
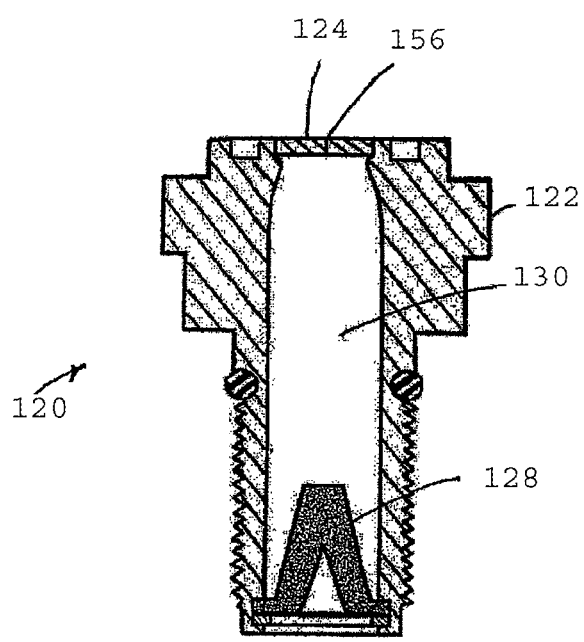
FIG. 10 is a cross-sectional view of a gas valve having a slit membrane at an entrance port into the valve.
Figure 11:
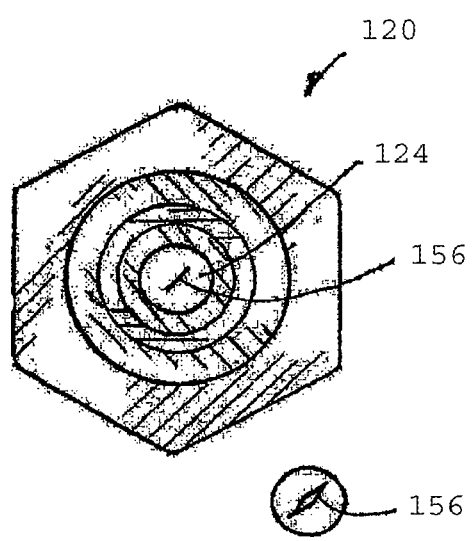
FIG. 11 is a top view of the gas valve shown in FIG. 10.

Referring to FIGS. 10 and 11, the barrier 124 may comprise a membrane with a slit 156. In such embodiments, the barrier 124 may be made of non-porous material such as latex, rubber, silicone, or any suitable polymer. Alternatively, the membrane-type barrier 124 may be made of a porous material that is not penetrated by water and other contaminants at atmospheric pressure. When the scuba tank is not connected to the gas valve 120 (or when the membrane-type barrier is otherwise not exposed to a high-pressure fluid), the slit 156 is closed so as to prevent contaminants from penetrating the barrier 124 and entering the passageway 130 downstream of the membrane barrier. When a scuba tank is connected to the gas valve 120 and the scuba tank valve is opened, the slit in the membrane experiences a pressure that stretches the barrier surface and causes the slit to open, thus allowing the gas to enter the passageway 130 of the gas valve 120. When the gas valve 120 is disconnected from the scuba tank, the membrane of the barrier 124 is no longer under pressure and the slit 156 returns to its original closed position, once again preventing the entrance of low-pressure liquids (e.g., water) and other contaminants into the passage 130 of the gas valve 120.

Figures 12, 13:
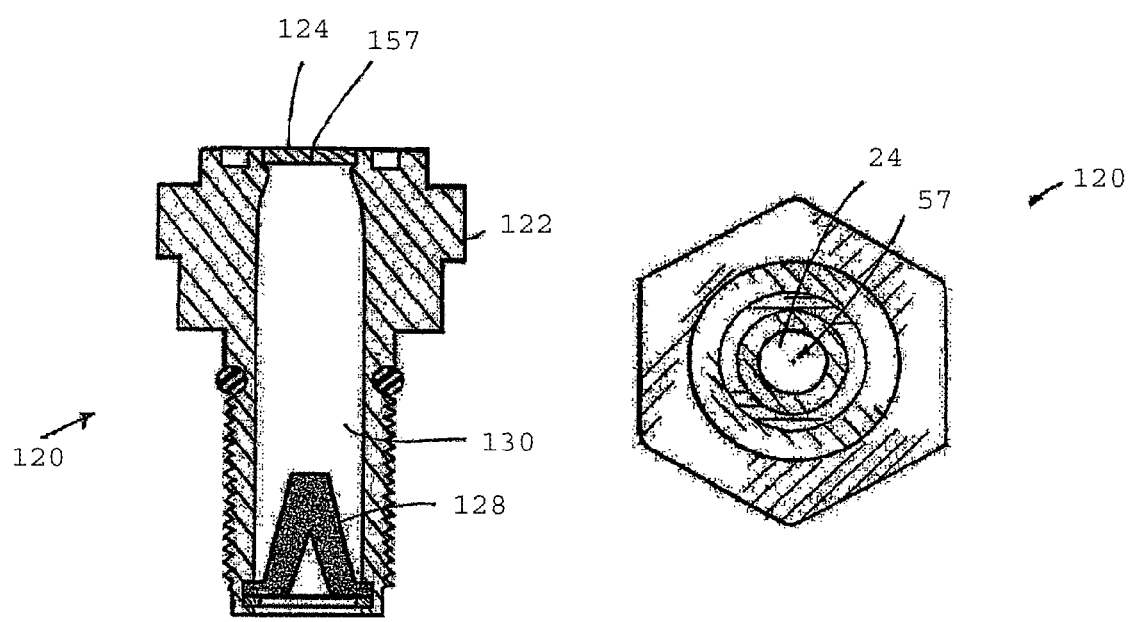
FIG. 12 is a cross-sectional view of a gas valve having a membrane with a pinhole at an entrance port into the valve.
FIG. 13 is a top view of the gas valve shown in FIG. 12.

Referring to FIGS. 12 and 13, in certain embodiments, the barrier 124, 24 comprises a membrane with a pinhole 157, 57. As in the previous embodiment, the pinhole 157, 57 prevents water and contaminants from entering into the passageway 130 of the gas valve 120, 20 when the scuba tank is not connected, but stretches to allow the passage of compressed gas when the gas valve 120, 20 is connected to the scuba tank. The use of a pinhole 157, 57 may offer certain designed advantages over the slit 156. For instance, the value of the predetermined activation pressure may be increased by using a pinhole rather than a slit.

Figure 14:
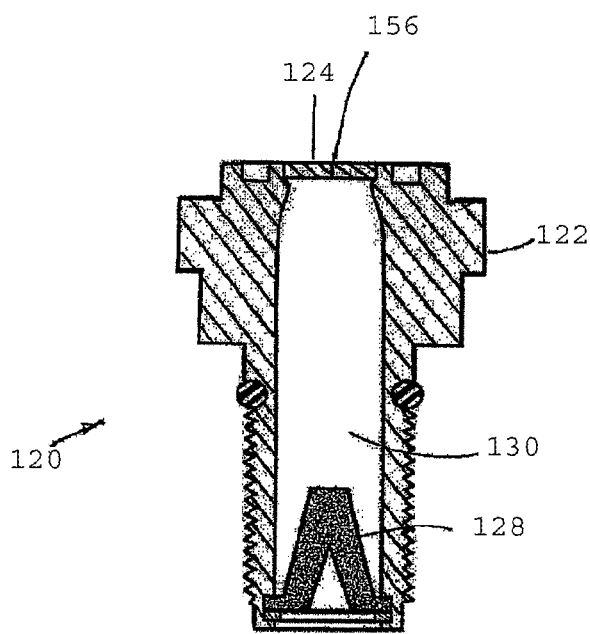
FIG. 14 is a cross-sectional view of a gas valve having a membrane with a pair of orthogonal slits at an entrance port into the valve.
Figure 15:
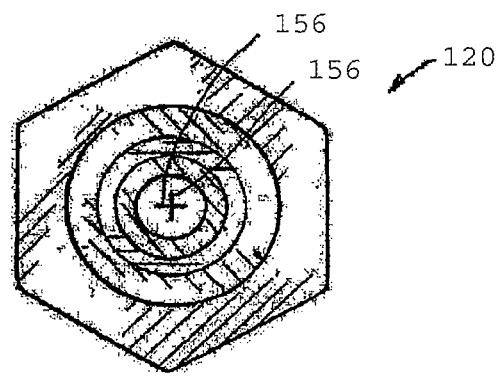
FIG. 15 is a top view of the gas valve shown in FIG. 14.

Referring to FIGS. 14 and 15, in certain other embodiments, the barrier 124 of the gas valve 120 comprises a membrane containing a plurality of slits 156. In the illustrated embodiment, the membrane comprises two slits 156 of substantially equal length that are in the form of a cross. Alternatively, the barrier 124 may comprise more than two slits 156, or the slits 156 may be of different lengths and/or cut to different depths into the membrane. In yet other embodiments, the barrier 124 may comprise a membrane having a combination of one or more slits 156 with one or more pinholes 157 to provide a particular membrane performance. The number and characteristics of the slits 156 and/or pinholes 157 placed in the membrane may be selected such that a desired performance is achieved, for example, the predetermined pressure at which the barrier 124 allows for the passage of a compressed gas.

Figure 16:
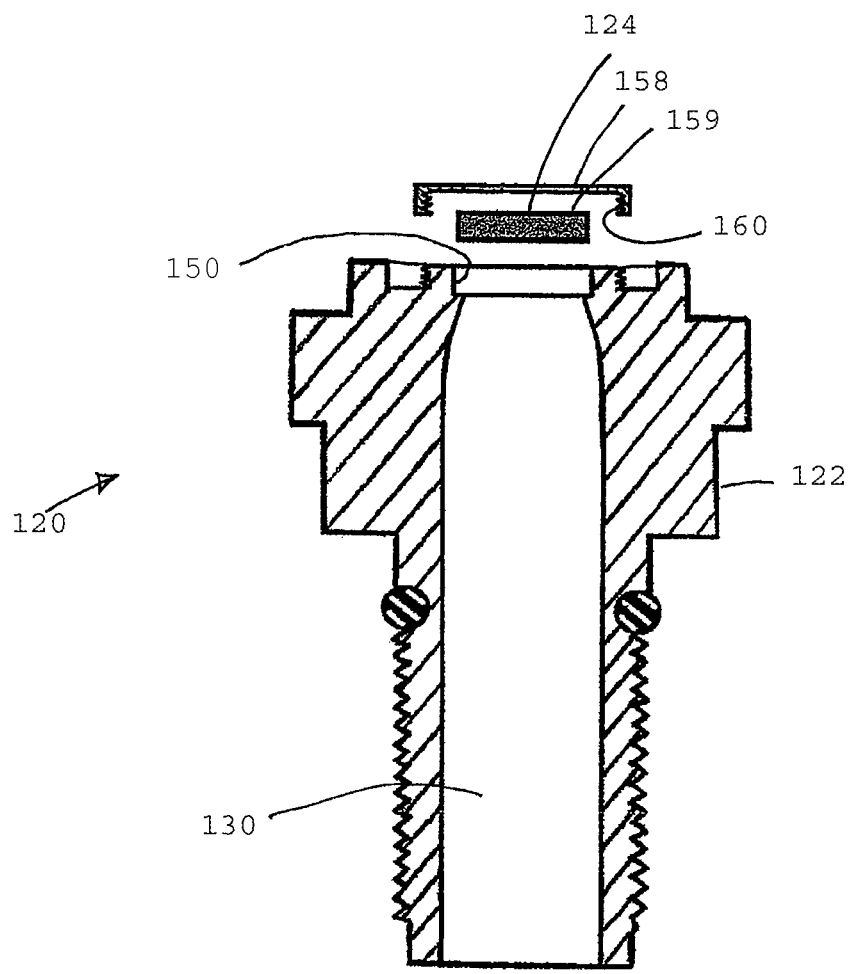
FIG. 16 is a cross-sectional view of a gas valve having a filter removably attached to the valve at an entrance port into the valve by a fastener.

In certain embodiments, such as that illustrated in FIG. 16, the gas valve 120 comprises a retainer 158 that is detachably coupled to the valve housing 122 and secures the barrier 124 within the passageway 130 or the valve housing 122. When attached to the valve housing 122, the retainer 158 preferably contacts a least a portion of the outside surface 159 of the barrier 124 so as to secure the barrier 124 to the valve housing 122. The retainer 158 preferably has an open portion that leaves at least a portion of the outside surface 159 of the barrier 124 exposed to the environment so as to allow compressed gas to flow through the barrier 124 when the valve 120 is connected to a pressurized gas source.

The retainer 158 preferably comprises a threaded portion 160 for attaching the retainer 158 and the barrier 124 to the valve housing 122. Alternatively, the retainer 158 may utilize a snap-on configuration for attaching the retainer 158 and the barrier 124 to the valve housing 122. In certain embodiments, other devices and/or means are used in place of or in combination with the retainer 158 for securing the barrier 124 to the valve housing 122. For instance, the diameter of the barrier 124 may be made slightly larger than the inner diameter of the lip 150 of the valve housing 122. In such embodiments, the barrier 124 is secured to the valve housing 122 by utilizing an interference fit of the barrier 124 with an inner diameter of the lip 150. Alternatively, an adhesive or bonding compound may be used for attaching the barrier 124 to the valve housing 122.

Figure 17:
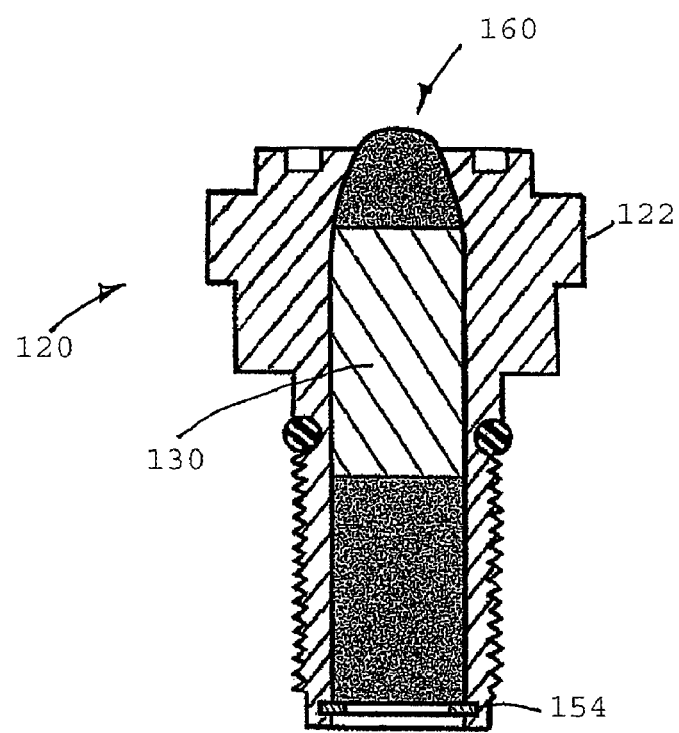
FIG. 17 is a cross-sectional view of a gas valve comprising a filter cartridge
Figure 18:
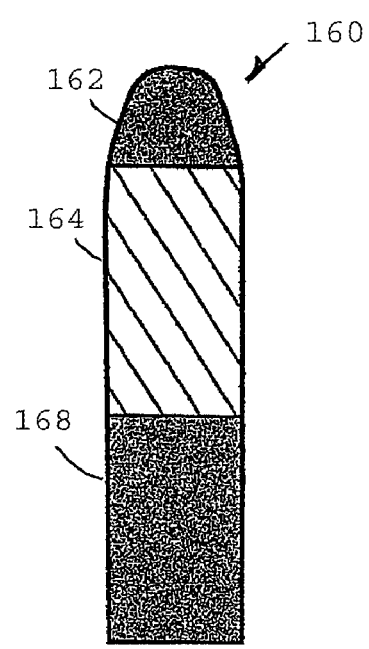
FIG. 18 is a cross-sectional view of the filter cartridge shown in FIG. 17.

Referring to FIGS. 17 and 18, in certain embodiments, the gas valve 120, which may be part of a gas regulator as discussed above, comprises a cartridge 160. The cartridge may comprise the barrier 124, which is formed from a material which is porous to compressed gas but which substantially prevents a low-pressure liquid from advancing through the passageway 130 downstream of the barrier 124.

The cartridge 160 may contain a plurality of elements, for instance a first element 162, a second element 164, and a third element 168. In one embodiment, the first element 162 comprises the barrier 124, the second element 164 comprises a carbon material or DIVESORB™, and the third element 168 comprises a post filter that collects excess carbon in the second element 164 and that otherwise filters the gas passing through the passageway 130.

In other embodiments, the first element 162 of the cartridge 160 comprises a pre-filter that is used in conjunction with the filter of the third element 168. In such embodiments, the gas valve 120 either does not contain the barrier 124 or the barrier 124 is attached upstream of the first element 162 of the cartridge 160. Other combinations of barriers and gas conditioners are also consistent with embodiments of the valve regulator 120. The cartridge 160 may also comprise more or fewer elements than the three elements 162, 164, 168 of the illustrated embodiment.

The cartridge 160 may be formed so as to substantially fill the passageway 130 of the valve housing 122, as illustrated in FIG. 17. When the first element 162 comprises a barrier, the barrier may be any of the various embodiments of the barrier 124 illustrated or suggested herein. The first element 162 may protrude above the surface of the raised collar 144, as illustrated in FIG. 17, or alternatively, may be flush with the surface of the raised collar 144, as illustrated, for example, in FIGS. 5 and 7.

Figure 19:
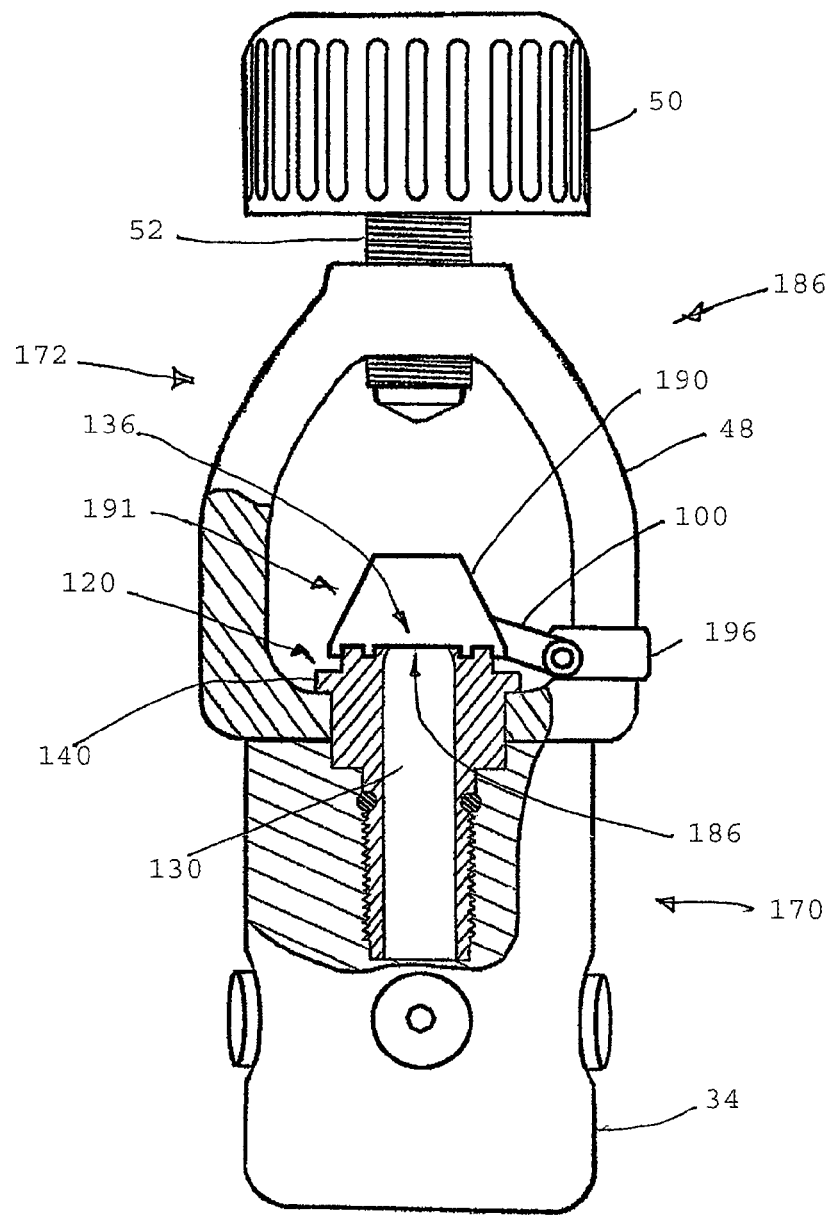
FIG. 19 is a side view of a gas valve with a movable cap that automatically covers the entrance port of the valve when not attached to a scuba tank.
Figure 20:
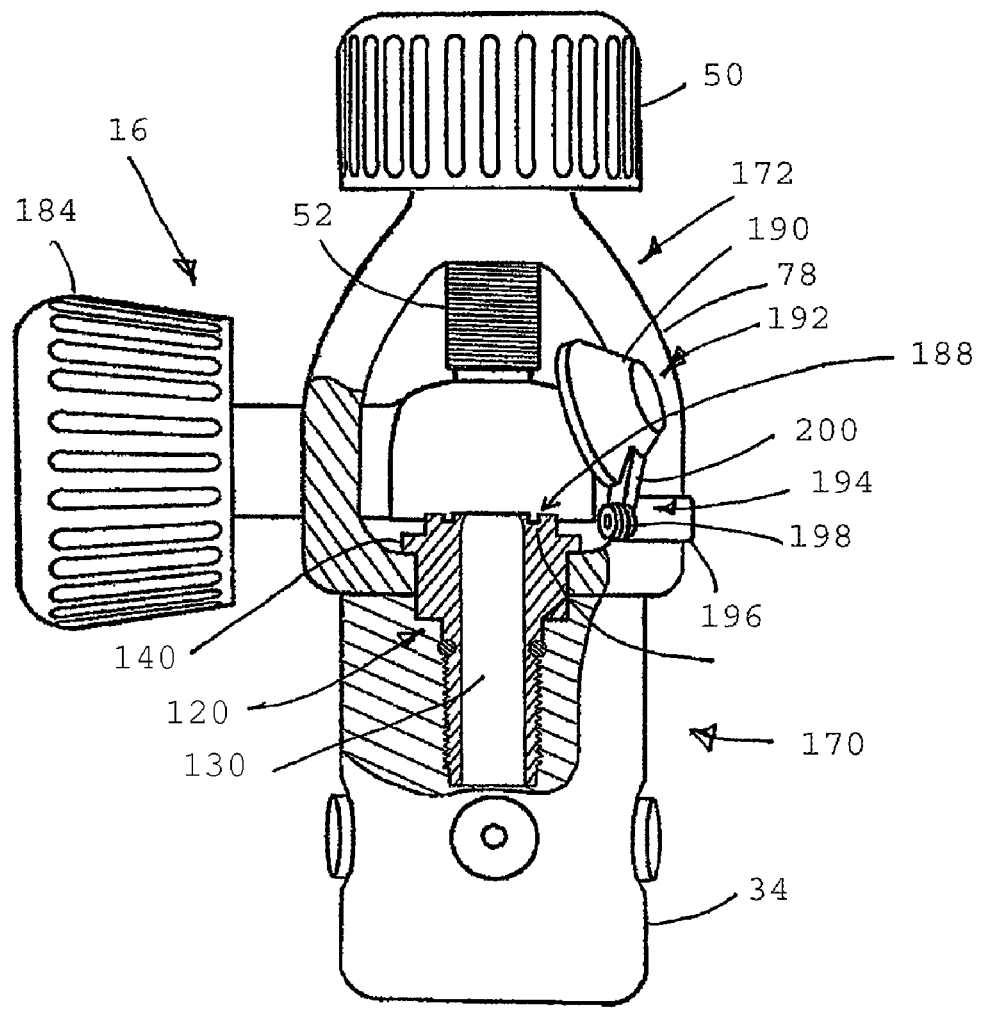
FIG. 20 is a side view of the gas valve shown in FIG. 19 showing an inlet/outlet scuba tank valve attached to the gas valve.

Referring to FIGS. 19 and 20, in certain embodiments, the gas valve 120 may be integrated into a gas regulator 170 comprising a regulator housing 34 containing further components for regulating the flow and/or pressure of gas from a high-pressure source such as a scuba tank as shown above. Embodiments of the gas valve 120 may be used in conjunction with a yoke-type connection, a DIN valve connection, or other less common connector systems, such as those utilized in technical diving and rebreather units.

For purposes of illustration, FIGS. 19 and 20 show the use of the gas valve 120 with a gas regulator 170 having a yoke-type connector 172. The yoke-type connector 172 comprises the yoke 48, the screw member 52, and the hand knob 50. The yoke-type connector 172 is preferably attached to the gas regulator 170 using the nut-shaped portion 140 of the valve housing 122.

Referring to FIG. 20, the yoke-type connector 172 may be used to attach a tank valve, such as the tank valve 16, by screwing the screw member 52 onto the tank valve 16 using the hand knob 50. The tank valve 16 comprises a knob 184 that may be used to deliver compressed gas from the scuba tank once the tank valve 16 is securely fastened to the gas regulator 170.

Again referring to FIGS. 19 and 20, in certain embodiments, the gas regulator 170 comprises an inlet opening 186, the passageway 130, which extends downstream of the inlet opening 186, and an attachment portion 188 near the inlet opening 186, which is configured for connecting the regulator 170 to a pressurized gas source. The regulator 170 further comprises the barrier 124 in the form of a movable cap 190. The attachment portion 188 is disposed near the inlet opening 186 and is configured for connecting the regulator 170 to a pressurized gas source such as a scuba tank. The movable cap 190 is adapted to cover the inlet opening 186 and has a range of motion between a first position 191 (FIG. 19), wherein the movable cap 190 covers the inlet opening 186, and a second position 192 (FIG. 20) outside of the passageway 130, wherein the movable cap is displaced from the inlet opening. The movable cap 190 is biased towards the first position 191 by a biasing element 194. The gas regulator 170 may also comprise an attachment device 196 for coupling the movable cap 190 and for biasing element 194 to the gas regulator 170.

The attachment portion 188 is configured to mate with tank valve 16 to form a gas-tight seal when coupled to the regulator 170 using the screw member 52. Typically, the tank valve 16 comprises an o-ring that mates against the surface of the raised collar 144 of the valve housing 122 to form the gas-tight seal.

The movable cap 190 is preferably made of a substantially non-porous material such as a metal or plastic. The movable cap 190 is preferably rigid, but may also be made of a softer material, such as rubber, so long as it has a sufficiently rigid form to remain in place over the inlet opening 186 when the regulator 170 is disconnected from the tank valve. Preferably, when the movable cap 190 is in the first position 191, a seal is formed near the upstream side 136 of the valve housing 122 that prevents water splashed onto or surrounding the regulator 170 from entering the passageway 130. The movable cap 190 may incorporate an o-ring (not shown) that mates with a portion of the raised collar 144 to aid in forming the seal. Alternatively, the movable cap 190 may be sufficiently soft so as to form a seal around the inlet opening 186. Alternatively, the surface of the movable cap 190 that mates with the raised collar 144 may be formed with a protruding annular portion that fits inside the groove 148 and/or overhangs or surrounds the outer circumference of the raised collar 144.

In a preferred embodiment, the biasing element 194 comprises a spring hinge 198 attached to an arm 200 for coupling the movable cap 190 to the attachment device 196. The spring hinge 198 biases the cap 190 toward the first position 191. The movable cap 190 pivots about the spring hinge 198, which produces a larger torque on the arm 200 as the movable cap 190 moves from the first position 191 to the second position 192. The biasing condition created by the spring hinge 198 is advantageous, since it automatically locates the movable cap 190 to the first position 191 whenever the regulator 170 is disconnected from the tank valve 16.

Alternatively, the biasing element 194 may be formed by making the arm 200 of a resilient material and disposing the movable cap 190 so that it is in the first position 191 when the arm 200 is in an unstressed or low-stress state. As the movable cap 190 is moved to the second position 192, stresses increase in the arm 200 to produce a torque that biases movable cap 190 back towards the first position 191. Other devices or means in the art may be used to form a suitable biasing element 194 for biasing the movable cap 190 towards the first position 191.

The attachment device 196, used to couple the movable cap 190 to the gas regulator 170, comprises any of the various devices and techniques used in the art. For instance, the attachment device 196 may comprise a clamp that fits around a portion of the yoke 48, as illustrated in FIGS. 19 and 20. Alternatively, the attachment device 196 may comprise a threaded base that is screwed into a portion of the body of the gas regulator 170. An alternative base could also be in the form of an annular ring that fits between the yoke 48 and the nut-shaped portion of the valve housing 122.

Figure 21:
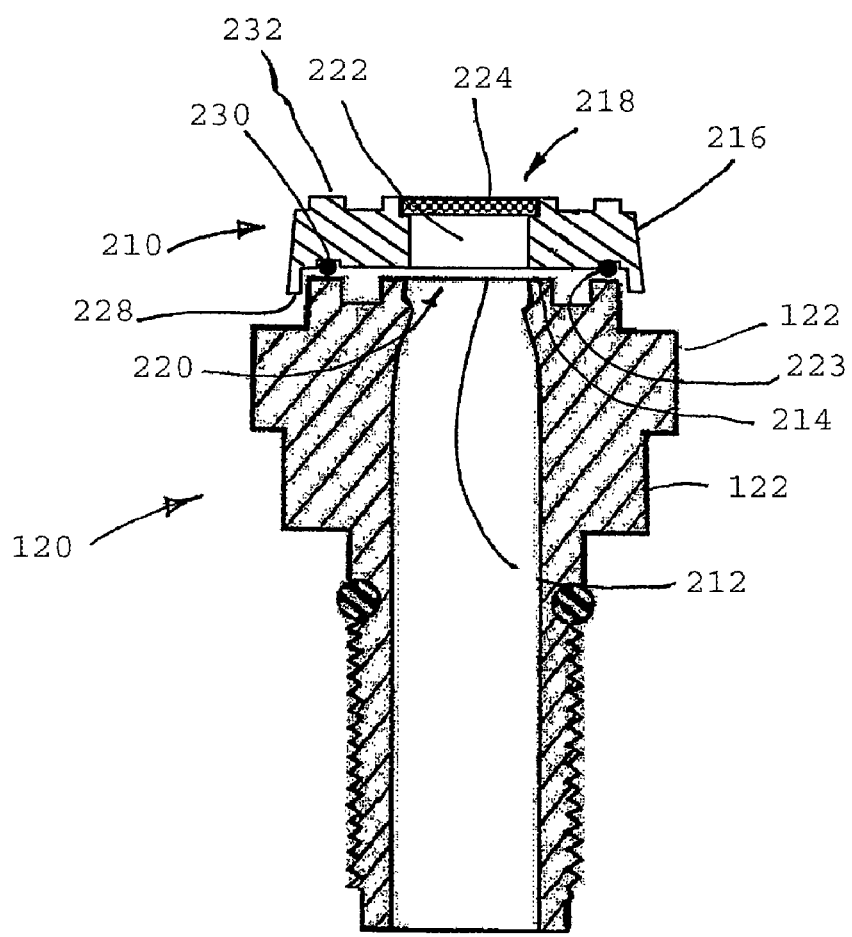
FIG. 21 is a cross-sectional view of a gas valve that is covered by a cap containing a barrier that is porous to compressed gas.

Referring to FIG. 21, in certain embodiments, a cap 210 is used with the gas valve 120 of a regulator such as, without limitation, the first stage regulator 32 discussed above, wherein the gas valve 120 has an inlet opening 212 and an inlet sealing face 214 surrounding the inlet opening 212. The cap 210 comprises a cap body 216 having an upstream side 218 and a downstream side 220 and a cap opening 222 extending from the upstream side 218 to said downstream side 220. The cap body 216 forms a cap sealing face 223 on said downstream side 220. The cap 210 further comprises a barrier 224, which is disposed across the cap opening 222 and is formed from a material which is porous to compressed gas but which substantially prevents passage of low-pressure liquid downstream of the downstream end of said barrier 224.

Once the cap 210 is attached to the valve housing 122, the cap 210 protects the downstream portions of the valve 120 and/or regulator 132 from contamination via, inter alia, the barrier 224. The barrier 224 may be generally similar to any of the embodiments of the barrier 124 discussed above. The cap 210 may be configured for coupling to a valve housing that is specifically designed for use with the cap 210. Alternatively, the cap 210 may be configured for coupling to a valve housing made according to conventional design or any other commercially available design. In such cases, the cap 210 allows any suitable gas valve to take advantage of the benefits offered by embodiments of the barrier 124 previously described herein.

The cap 210 may be attached to the valve housing 122 of the gas valve 120 using attachment means common in the art. For instance, the cap 210 could have through holes (not shown) in the cap body 216 corresponding to tapped holes (not shown) in the valve housing 122. In such embodiments, the cap body 216 is attached to the valve housing 122 by running screws or bolts into the holes in the cap body 216 and the valve housing 122. An o-ring 230 may be used as the cap sealing face 223 of the cap body 216 and/or the inlet sealing face 214 of the valve housing 122. Alternatively, the cap 210 could be manufactured with an annular lip 228 configured with an inner diameter for press fitting the cap body 216 onto the valve housing 122. The annular lip 228 may have threads (not shown) for screwing the cap 120 onto the valve housing. Other threaded engagement systems may also be employed. In yet other alternatives, an adhesive, glue, epoxy, or solder could be used to attach the cap body 216 to the valve housing 122. As still another alternative, no attachment means may be employed.

The inlet sealing face 214 of the valve housing 122 may comprise a flat annular surface or a raised collar like the raised collar 144 with the groove 148, as shown in FIG. 21. Other configurations of the inlet sealing face 214 may be used to accommodate the interfacing between the cap body 216 and the valve housing 122. In certain embodiments, the cap 210 further comprises a source sealing face 232 disposed at the upstream side of the cap body 216. The source sealing face 232 may be used to accommodate the tank valve 16 of the scuba tank 14. In certain embodiments, the source sealing face 232 is similar to the inlet sealing face 214, for example when the cap 210 is used on a gas valve made for use with a yoke-type fitting.

In certain embodiments, the barrier 224 extends across the upstream end of cap opening 222 and the upstream end of the barrier 224 may be substantially flush with the source sealing face 232, as illustrated in FIG. 21. The barrier 224 is preferably at least partially disposed within cap opening 222.

Referring again to FIGS. 1 and 4, in certain embodiments, a method of providing air to a scuba diver comprises providing the gas regulator 170 with the barrier 124, wherein the barrier 124 is formed from a material which is porous to compressed gas, but which substantially prevents a low-pressure liquid from advancing through the passageway 130 downstream of the barrier 124. The method further comprises connecting a source of compressed gas to the gas valve 120. The method also comprises flowing compressed gas through the barrier 124. The method also comprises conditioning the compressed gas to a condition wherein a human may breathe the gas.

In such embodiments, the gas regulator 170 may be incorporated into a prior art scuba unit such as the scuba unit 10 in FIG. 4. The gas regulator 170 is assembled by installing the gas valve 120 with a barrier 124 (which barrier 124 is constructed according to one or more of the embodiments discussed above) into the regulator housing 34 shown in FIG. 1. Once gas regulator 170 is assembled, the barrier 120 seals the upstream port 132 of the gas valve housing from the outside environment and liquid is substantially prevented from advancing though the passageways of the gas regulator 170. Thus, the internal portions of the gas regulator 170 are protected from contaminants such as water when not connected to the scuba tank 14. As discussed above herein, other structural components may be used reduce the amount of water or other liquids on top of the barrier 120, such as supplying the groove 148 of the raised collar 144 or forming the upstream side of the barrier 120 into a dome shape.

The barrier 124 may contain one or more pinholes or slits that are closed when the barrier 124 is exposed to fluid(s) at atmospheric pressure, such as illustrated in FIGS. 10-15. Under such conditions, the barrier 124 may be made of an impermeable material that prevents the entry of a liquid into the gas regulator 170. Alternatively, the barrier 120 may be made of an expanded polytetrafluoroethylene (e.g., GORE-TEX™). In such cases, liquid contaminants such as water may partially soak into the barrier 124, but are prevented from advancing downstream of the downstream end of the barrier 124 while the barrier is exposed to liquid at or near atmospheric pressure. In such embodiments, a small amount of water or contaminants might be blown through the gas valve when the scuba tank is attached and the scuba tank valve is open; however, the small amount of contaminant quickly passes through and out of the regulator, thus precluding a negative impact on the gas regulator 170.

Once the diver is ready to use the scuba unit 10, the gas regulator 170 is attached to the scuba tank 14 and the scuba tank valve 16 is opened. Since the barrier 124 is porous to compressed gas, the compressed gas passes through the gas regulator and to the diver. When the scuba tank 14 is later removed, the barrier 124 is at atmospheric pressure and liquid is again substantially prevented from advancing though the passageways of the gas regulator 170.

The method of providing air to a scuba diver may further comprise flowing compressed gas through the barrier 124. The method also comprises conditioning the compressed gas to a condition wherein the gas may be breathed by a human. Conditioning may comprise reducing the pressure of the air from the source to a pressure suitable for breathing. Conditioning may further comprise adapting the air for use by a scuba diver or adapting the air for use in a respiration system. The method may further comprise installing the gas valve in to a regulator.

In other embodiments, as illustrated in FIGS. 19 and 20, a method of providing air to a scuba diver comprises providing a gas regulator 170 with the inlet opening 186 and the movable cap 190, wherein the movable cap 190 is biased toward the first position 191 wherein the movable cap 190 covers the inlet opening 186 of the gas valve 120. The method further comprises connecting a source of compressed gas to the gas valve 120. The method also comprises connecting the source of compressed gas and moving the movable cap 190 to a second position wherein the movable cap 190 is displaced from the inlet opening 186. The method also comprises flowing compressed gas through the opening. The method also comprises conditioning the compressed gas to a condition wherein a human may breathe the gas.

Referring again to FIGS. 1 and 4, the gas regulator 170 is assembled as discussed above herein. Prior to connection of the gas regulator 170 to the scuba tank 14, the movable cap 190 is in the first position 191. With the movable cap 190 in the first position 191, the inlet opening 186 of the gas valve 120 is covered and sealed such that contaminants are blocked form entering the passageways of the gas regulator 170.

Once the diver is ready to use the scuba unit 10, the gas regulator 170 is attached to the scuba tank 14 and the scuba tank valve 16 is opened. During attachment of the gas regulator 170 to the scuba tank 14, the movable cap 190 is moved from the first position 191 shown in FIG. 19, to the second position 192 shown in FIG. 20. With the movable cap 190 in the second position, the inlet opening 186 of the gas valve 120 is accessible for connecting the gas regulator 170 to the scuba tank valve 16. Preferably, the movable cap 190, and associated hardware, are configured so that the movable cap 190 is actuated by the attachment of the scuba tank valve 16 to automatically move from the first position 191 to the second position 192. Alternatively, the movable cap 190 may be manually actuated. In such embodiments, prior to attaching the gas regulator 170 to the scuba tank 14, the diver moves the moveable cap 190 by hand by overcoming the force of the biasing element 194.

When the scuba tank 14 is later removed, the movable cap 190 returns to the first position 191, again covering the inlet opening 186 of the gas valve 120 so as to prevent contaminants from entering the interior passageways of the gas regulator 170. In other embodiments, the biasing element 194 is not present and the inlet opening 186 is covered by manually moving the movable cap 190 from the second position 192 to the first position 191.

Either of the above methods of providing air to a scuba diver may further comprise flowing compressed gas through the barrier 124. The method also comprises conditioning the compressed gas to a condition wherein the gas may be breathed by a human. Conditioning may comprise reducing the pressure of the air from the source to a pressure suitable for breathing. Conditioning may further comprise adapting the air for use by a scuba diver or adapting the air for use in a respiration system. The method may further comprise installing the gas valve in to a regulator.

Embodiments of the gas regulator 170 incorporating the gas valve 120 provide a relatively simple, yet very effective, arrangement for preventing the inadvertent entry of water and other contaminants into the first or second stage regulator members of a scuba diving unit. Embodiments of the gas regulator 170 eliminate the requirement that the user of a scuba diving unit remember to place a dust cap over the entrance port of the gas valve and eliminate or reduce the need to clean the gas regulator after use.

Embodiments of the gas valve 120 may also be utilized with second stage regulators when in the form of an alternate air sources. The gas valve 120 may be utilized with any type of gas used in the scuba diving industry, including various types of breathable gas mixtures, as well as other types of systems that are used in scuba diving but not necessarily for breathing. For example, embodiments of the gas valve 120 may be use in conjunction with cylinders of compressed argon for inflating dry suits. In another example, extended range scuba divers require the use of multiple compressed breathing gas tanks for decompression purposes. As such, the scuba diver, when performing such extended range functions, must change regulator connections between tanks while underwater. Heretofore, this process flooded the regulators, creating initial breathing problems as well as creating the difficulty of cleaning and drying the internal components of the regulators after the extended range dive was concluded. Embodiments of the gas valve 120 may be used to obviate these problems and facilitate changing of compressed gas bottles while underwater. Finally, embodiments of the gas valve 120 may also be utilized in an inlet valve arrangement for rebreather scuba units.

Embodiments of the present invention should not be limited by the specific illustrations and embodiments described in detail above. While the embodiments of the present invention were initially developed for the scuba diving industry, those skilled in the art will appreciate the embodiments of the gas regulator 170, gas valve 120, and the gas valve 120 have much broader implications and applications. The gas valve 120 may be utilized in a variety of fluid flow environments and devices and should not, therefore, be limited to gaseous fluids. Various types of devices or systems wherein fluid under pressure is directed into a one-way inlet valve may benefit from the embodiments of the present invention.

Embodiments of the present invention may be used in a variety of applications and environments where protection from the entry of contaminant is desirable when the valve is disconnected a supply source. Examples include an inlet valve, a gas valve, a medical regulator for oxygen, air or other gases, a welding gas regulator, a second stage diving regulator, an inflator hose valve, buoyancy gas valve, a quick disconnect valve, a quick disconnect hose, or any other kind of gas valve where avoidance of contamination is desirable.

The foregoing description and the illustrative embodiments of the present invention have been described in detail in varying modifications and alternate embodiments. It should be understood, however, that the foregoing description of the present invention is exemplary only, and that the scope of the present invention is to be limited only to the claims as interpreted in view of the prior art. Moreover, the invention illustratively disclosed herein may be practiced in the absence of any element which is not specifically disclosed herein.

What is claimed is:

1. A regulator device configured to reduce the gas pressure of a source of pressurized breathable gas in a self contained underwater breathing apparatus, comprising:
　a regulator housing;
　a gas inlet opening located within a bore in the regulator housing;
　a gas valve, comprising:
　　a housing possessing an inlet opening and an exit opening;

a passageway extending downstream of the inlet opening;

a filter located within the passageway and proximate the exit opening and distal the inlet opening so that fluid must pass through the filter to pass through the exit opening; and a retainer device for removably securing the filter within the exit opening of the passageway; and a moveable cover member adapted to cover the inlet opening of the gas valve, the moveable cover member having a range of motion between a first position wherein the moveable cover member covers the inlet opening and a second position outside of the passageway wherein the moveable cover member is displaced from the inlet opening, the moveable cover member being biased towards the first position;

wherein the housing of the gas valve includes a portion threaded into the bore of the regulator housing;

wherein the exit opening of the gas valve is in fluid communication with the gas inlet opening of the regulator housing;

wherein the moveable cover member is adapted to move from the first position to the second position when the valve is attached to a source of compressed gas; and wherein the moveable cover member is adapted to automatically move from the second position to the first position when the valve is disconnected from a source of compressed gas.

2. The valve of claim 1 further comprising a biasing element biasing the moveable cover member to the first position and being attached to the housing and being adjacent to the inlet opening.

3. The valve of claim 2 further comprising a screw member threadably connected to the housing and attached to a hand knob, the screw member being in contact with the moveable cover member in the first position to apply a linearly force and the biasing member continuously biasing the moveable cover member towards the first position.

4. The valve of claim 1 further comprising a biasing element continuously biasing the moveable cover member to the first position and being in continuous contact with the movable cover member.

5. The valve of claim 4 wherein the biasing element comprises a spring hinge attached to an arm coupling the moveable cover member to an attachment member.

6. The valve of claim 4 wherein the biasing element comprises a resilient arm attached to the movable cover member.

7. The valve of claim 6 wherein the resilient arm is in a low stress condition with the movable cover member being in the first position and being in a high stress condition with the movable cover member being in the second position.

8. A regulator device configured to reduce the gas pressure of a source of pressurized breathable gas in a self contained underwater breathing apparatus, comprising:

a regulator housing;

a gas inlet opening located within a bore in the regulator housing;

a gas valve, comprising:

a housing possessing an inlet opening and an exit opening;

a passageway extending downstream of the inlet opening;

a filter located within the passageway proximate the exit opening and distal the inlet opening so that fluid must pass through the filter to pass through the exit opening; and a retainer device for removably securing the filter within the exit opening of the passageway; and a moveable cover member adapted to cover the inlet opening of the gas valve, the moveable cover member having a range of motion between a first position wherein the moveable cover member covers the inlet opening and a second position outside of the passageway wherein the moveable cover member is displaced from the inlet opening, the moveable cover member being biased towards the first position;

wherein the housing of the gas valve includes a portion threaded into the bore of the regulator housing;

wherein the exit opening of the gas valve is in fluid communication with the gas inlet opening of the regulator housing;

wherein the moveable cover member is adapted to move from the first position to the second position when the valve is attached to a source of compressed gas; and wherein the moveable cover member is adapted to automatically move from the second position to the first position when the valve is disconnected from a source of compressed gas;

further comprising a screw member threadably connected to the housing and attached to a hand knob, the screw member being distal from the moveable cover member with the moveable cover member being in and biased into the first position.

* * * * *